(12) United States Patent
Rooker et al.

(10) Patent No.: US 12,341,805 B1
(45) Date of Patent: Jun. 24, 2025

(54) MITIGATION OF MALWARE CODE-DISTRIBUTION SITES

(71) Applicant: Amazon Technologies, Inc., Seattle, WA (US)

(72) Inventors: Kelly Anne Rooker, Seattle, WA (US); Lewis Iain McLean, Seattle, WA (US); Andrew Robert Hassall, Seattle, WA (US); Grace Marie Hatamyar, Seattle, WA (US); Thomas Bradley Scholl, Seattle, WA (US); Kushal Mall, Seattle, WA (US); Darshan Reddy, Seattle, WA (US); Bradford Sachin Chatterjee, Seattle, WA (US); Bobby Brown, Seattle, WA (US); Sidath Manawadu, Seattle, WA (US); Karthik Chandrashekar, Seattle, WA (US); John Shields, Seattle, WA (US); Thomas William Bray, Seattle, WA (US); Benjamin Patrick Albertson-Gass, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 462 days.

(21) Appl. No.: 17/833,680

(22) Filed: Jun. 6, 2022

(51) Int. Cl.
H04L 9/40 (2022.01)
(52) U.S. Cl.
CPC ........ *H04L 63/145* (2013.01); *H04L 63/1416* (2013.01); *H04L 63/1458* (2013.01)

(58) Field of Classification Search
CPC .......... H04L 63/145; H04L 63/1416; H04L 63/1458
See application file for complete search history.

(56) References Cited

U.S. PATENT DOCUMENTS

| | | | |
|---|---|---|---|
| 2014/0331326 A1* | 11/2014 | Thakur | H04L 63/1433 726/25 |
| 2019/0372938 A1* | 12/2019 | Pasdar | H04L 63/029 |
| 2020/0007575 A1* | 1/2020 | Meriot | H04L 63/1458 |
| 2020/0014692 A1* | 1/2020 | Isola | H04L 63/107 |
| 2023/0308474 A1* | 9/2023 | Thompson | H04L 63/1441 |

* cited by examiner

*Primary Examiner* — Han Yang
(74) *Attorney, Agent, or Firm* — Knobbe, Martens, Olson & Bear, LLP

(57) ABSTRACT

The present disclosure generally relates to systems and methods for utilization of network mitigation techniques in the form of null address routing to mitigate coordinated DDOS attacks. One or more computing devices can install malware code into a network device after exploiting a vulnerability of the network device. A monitoring and mitigation service can monitor network devices and detect malware code installed on the network-based service. The monitoring and mitigation service can identify the internet protocol (IP) address or any routing information regarding the computing devices that sent the malware code. Based on the identified information, the monitoring and mitigation service can identify and implement the network mitigation information in the form of null routing addresses that will cause network communications associated with the identified computing device to be terminated or otherwise not delivered to the intended network-based resources.

22 Claims, 5 Drawing Sheets

MITIGATION OF MALWARE CODE-DISTRIBUTION SITES

BACKGROUND

Generally described, external computing devices and communication networks can be utilized to exchange data and/or information. In a common application, an external computing device can request content from another external computing device via the communication network. For example, a user having access to an external computing device can utilize a software application to request content or access network-hosed applications/functionality from an external computing device via the network (e.g., the Internet). Additionally, the external computing device can collect or generate information and provide the collected information to a network-based external computing device for further processing or analysis.

In some embodiments, a network service provider can provide external computing device resources, such as virtual machine instances, that are configurable to execute tasks based on inputs from the external computing device. In some scenarios, it may be possible that the external computing device distributes a malware code such that the input from the external computing device is to install and execute the malware code. In these scenarios, the malware code may be installed in a network device, and the network device can be compromised such that the compromised network device can abuse the network-based service resources by executing the malware code. In one example, a malware code can be installed on one or more network devices, and the network devices can be referred to as compromised network devices. In the example, a plurality of compromised network-based resources can be coordinated by the compromised network device. The compromised network device abuses the network-based service resources, such as in the form of a coordinated distributed denial of service ("DDOS") attack. The abuse can include but is not limited to causing congestion of the compromised cloud services, backbone links, internet transit, peering at external network adjacencies, etc.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
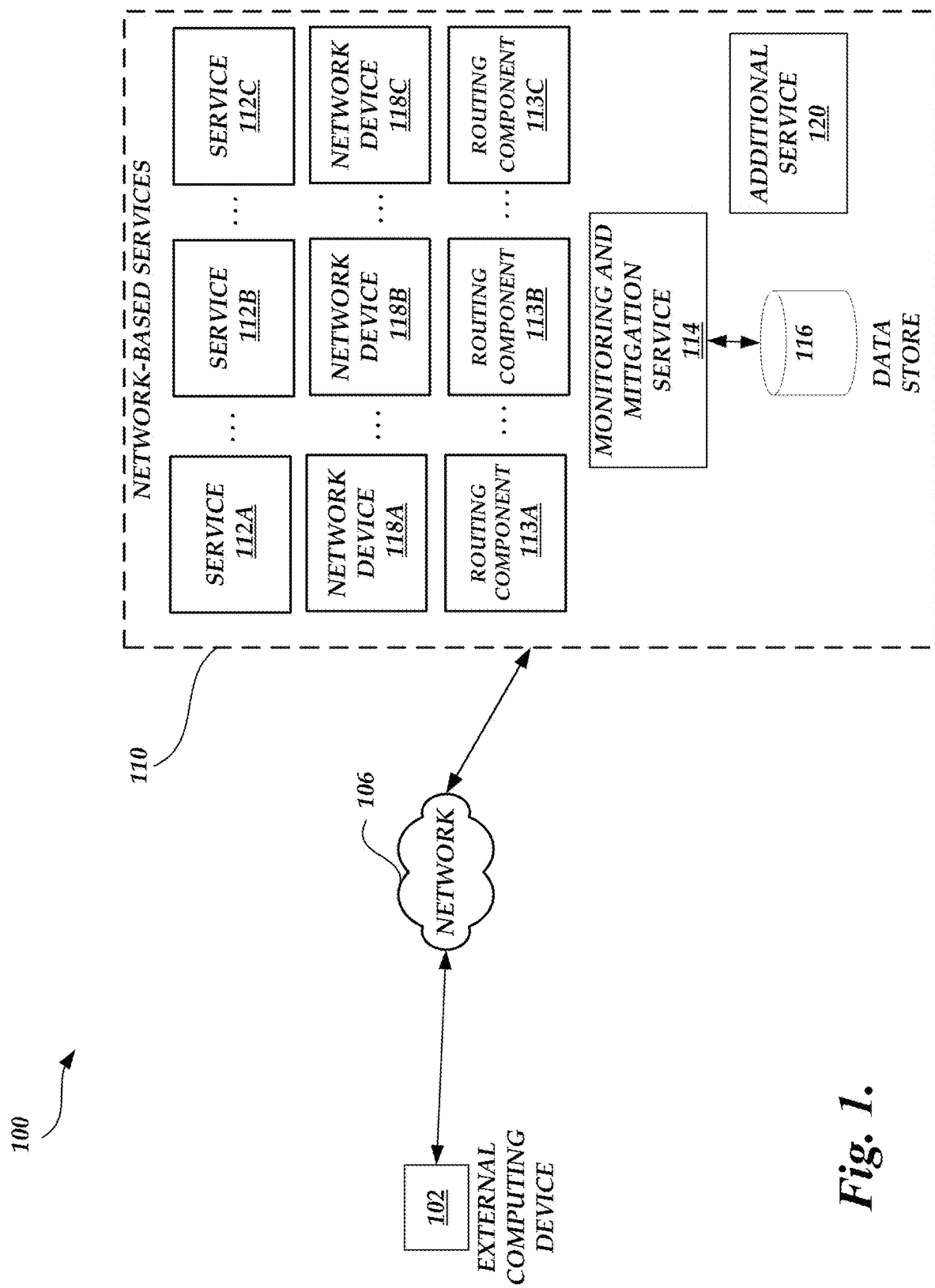
FIG. 1 is a block diagram depicting an illustrative system for implementing a network service for monitoring network-based services and implementing network mitigation techniques according to one or more aspects of the present application.

Aspects of the present disclosure relate to systems and methods for mitigating the manipulation of network-based computing resources utilizing network mitigation techniques. More specifically, one or more aspects of the present application correspond to the utilization of network mitigation techniques in the form of null address routing. Illustratively, a network service can implement a monitoring and mitigation service. In one aspect, the monitoring and mitigation service can detect attributes of network resource usage of network devices, such as the legitimate traffic information of network-based resources provided by the network services. Illustratively, one or more malware codes may be installed in the network device, and the malware code is executed on the network-based service. The executed malware code may abuse or manipulate the network-based resources. In this illustration, the monitoring and mitigation service can process monitoring the network usage attributes to characterize or identify the malware code and one or more external network destinations that may be a source of coordinated attacks or additional malware code. The external computing device can be characterized or identified as a malware code distribution node (e.g., malware code distribution site) that reflects monitored network behavior.

The monitoring aspect of the monitoring and mitigation service can be implemented as a service that performs the monitoring function for the monitoring and generates outputs indicative of the characterization of the network device as a compromised network device or the external computing device as a malware code distribution node that installed malware code to the compromised network device. More specifically, in one embodiment, the monitoring and mitigation service can implement or cause the implementation of dedicated network devices that customers do not otherwise create for purposes of being compromised as part of a malware code attack or other unauthorized action. Such dedicated network devices may be generally referred to as "honeypots." Illustratively, a network-based service can implement a set of such dedicated network devices, e.g., a set of honeypot network devices. For example, a network service can cause the instantiation of a set of elastic computing (EC2) instances in which instance is configured in a manner to be monitored for any manipulation from external parties.

By way of illustrative examples, an external computing device, also referred to as a malware code distribution node, in an attempt to exploit the vulnerability of the network-based services, may request or cause a request to install code (e.g., malware code) to one or more network instances, which can include one or more honeypot network instances. Specifically, the malware code distribution node will attempt to scan for as many network instances that can be detected and that have a vulnerability that will allow an initial set of malware code to be installed in the network device (e.g., a compromised network device). Thereafter, the compromised network device will be manipulated to transmit requests for additional malware code or instructions from external computing devices/services that are external to the network-based services.

Illustratively, an external computing device can send an initial code to multiple network instances, where the initial code is configured to exploit a vulnerability of network instances with a request to install a second code (e.g., malware code). The external computing device that sent the initial code can be referred to as a malware code distribution node. The initial code can be received by multiple network instances, including one or more dedicated network instances (honeypot network instances). The monitoring and mitigation service can be configured to monitor the dedicated network instances. For example, in response to receiving the initial code, the dedicated network devices (honeypot devices) may cause a transmission of the request, and the malware code distribution node may transmit a malware code to be installed in the dedicated network devices. The monitoring and mitigation service may detect the malware code installation and identify the internet protocol (IP) address or other routing information about the malware code distribution node. For example, the monitoring and mitigation service may demand a resolution to the malware code distribution node and encode the node's IP address. In some embodiments, the monitoring and mitigation device may use a plurality of sensors interconnected with the dedicated devices to encode the IP address. The term malware code distribution node does not have to be based on a particular set of non-permissible or non-desirable actions, which can vary.

In other aspects, the monitoring and mitigation service can process the identification and implementation of network mitigation techniques that prevent or limit access to network-based resources. More specifically, the monitoring and mitigation service, using the information identified from the manipulated dedicated network devices, can identify network mitigation information in the form of null routing addresses that will cause network communications transmitted from compromised network devices to the identified malware code distribution node to be terminated or otherwise not delivered. By applying the network mitigation technique across at least a subset of all the network devices, the monitoring and mitigation service can attempt to limit compromised network devices from receiving the configuration information or additional malware code that would be required for exploitation/further comprise of such compromised network devices. The monitoring and mitigation service can also propagate the network mitigation information, such as the null routing address, to routing components within the network service provider network. The routing components will then be updated with the network mitigation information to implement the network mitigation technique. In some embodiments, the network mitigation information can be associated with expiration criteria for the routing components that receive and implement the network mitigation technique.

Generally, traditional manipulation of network-based resources by malware code distribution nodes, such as coordinated DDOS attacks, presents significant technical challenges for network-based service providers. In one aspect, the targets (e.g., external computing device, cloud, or computing networks) of the coordinated attacks are subject to significant disruption or limitation of operational status, which may be independent of the network service provider. Accordingly, the network service provider resources can significantly disrupt computing systems and networks, especially in situations of a network service provider may offer customers multi-regional network resources. In other aspects, the manipulation of computing resources for purposes of generating large scale network attacks, such as DDOS attacks, especially in multi-tenant network resources, can present significant inefficiencies for the network service provider, including limiting the functionality of network resources, consuming network bandwidth and disrupting operations or functionality provided to other customers of the network service. As applied specifically to the teachings of the present application, in scenarios in which network devices (e.g., network resources) are initially compromised with malware code, the deficiencies associated with malware code or network attacks are typically magnified once the initially compromised network device transmits requests for additional malware code or instructions external to the network-based service.

To address at least a portion of the above-described deficiencies, one or more aspects of the present application correspond to systems and methods for utilizing network mitigation information. The network mitigation information may be identified or developed based scenarios in which malware code has been installed in targeted network devices (e.g., honeypot network devices). The malware code installed network device cause to manipulate or abuse network resources in a manner that is not desired or permissible, illustratively controlling network-based resources to elicit a coordinated attack on other network devices, computing networks, or external computing devices. The monitoring and mitigation service may monitor dedicated network devices such as honeypot devices. The monitoring and mitigation service can scan the dedicated network devices to detect any request from external computing devices to exploit a network vulnerability and a malware code installation. Illustratively, the monitoring and mitigation service, by monitoring the dedicated network devices, can determine at least one external computing device is exploiting a network vulnerability by sending a request to install a malware code to the dedicated network devices. The monitoring and mitigation service may cause the malware code installation into the dedicated devices. The monitoring and mitigation service can detect the malware code installation and identify the IP address or other routing information of the external computing device (referred to as a malware code distribution node) that sent the malware code.

In some aspects, network mitigation information can be provided to network routing components to cause disruption in communications directed to identified malware code distribution node and prevent any further manipulation from at least a portion of the network devices hosted by the network service. The network mitigation information can be implemented across multiple regions hosted by the network service provider. Additionally, the network mitigation information can be further associated with expiration data or otherwise terminated in a manner such that the network's performance, including routing functionality, will revert to previous states. This further provides efficiency in not requiring permanent changes to the routing information or affecting the long-term operation of the network functionality.

Although aspects of the present application will be described with regard to illustrative network components, interactions, and routines, one skilled in the relevant art will appreciate that one or more aspects of the present application may be implemented in accordance with various environments, system architectures, external computing device architectures and the like. Similarly, references to specific devices, such as a malware code distribution node, can be considered to be general references and not intended to provide additional meaning or configurations for individual external computing devices. Additionally, the examples are intended to be illustrative in nature and should not be construed as limiting.

FIG. 1 depicts a block diagram of an embodiment of the system 100. The system 100 can comprise a network, the network connecting a number of external computing devices 102 and a network service 110. Illustratively, the various aspects associated with the network service 110 can be implemented as one or more components that are associated with one or more functions or services. The components may correspond to software modules implemented or executed by one or more external computing devices, which may be separate stand-alone external computing devices. Accordingly, the components of the network service 110 should be considered as a logical representation of the service, not requiring any specific implementation on one or more external computing devices.

Network 106, as depicted in FIG. 1, connects the devices and modules of the system. The network can connect any number of devices. In some embodiments, a network service provider provides network-based services to client devices via a network. A network service provider implements network-based services and refers to a large, shared pool of network-accessible computing resources (such as compute, storage, or networking resources, applications, or services), which may be virtualized or bare-metal. The network service provider can provide on-demand network access to a shared pool of configurable computing resources that can be programmatically provisioned and released in response to customer commands. These resources can be dynamically provisioned and reconfigured to adjust to the variable load. The concept of "cloud computing" or "network-based computing" can thus be considered as both the applications delivered as services over the network and the hardware and software in the network service provider that provide those services. In some embodiments, the network may be a content delivery network.

The external computing device 102 in FIG. 1 can connect to the network and the network-based services 110. The external computing device 102 may be representative of a computing network associated with a plurality of external computing devices. Solely for illustration purposes, external computing device 102 represents a source of a set of actions that can lead to an attack utilizing one or more network devices/resources provided by the network service 110. Generally, the external computing device 102 attempts to configure attacks, such as a DDOS attack, by exploiting vulnerabilities by installing and executing an initial set of malware codes to one or more network devices or services. Once the initial set of malware codes is executed by a network device (e.g., a compromised network device), the compromised network device will attempt to request additional malware code, configurations, or instructions from the external computing device 102. The external computing device 102 can be identified or characterized as a malware code distribution node that provides configurations or commands to cause the use, manipulation, or compromise of the computing resources maintained by the network service 110 as part of a coordinated attack. The external computing device 102 may be considered a malware code distribution node that is the "instigator" or "coordinator" of the attack.

The external computing device 102 can be configured to transmit a request to the network service 110 to illustratively access one or more network-based services using a communication protocol. The external computing device 102 can be configured to have at least one processor. That processor can be in communication with the memory for maintaining computer-executable instructions. The external computing device 102 may be physical or virtual. The external computing devices may be mobile devices, personal computers, servers, or other types of devices. The external computing device 102 may have a display and input devices through which a user can interact with the user-interface component.

Illustratively, the network service 110 can include a plurality of network-based services that can provide functionality responsive to configurations/requests transmitted by the external computing devices 102, such as in the implementation of a set of microservices that are configured to provide underlying functionality to applications hosted by a service provider. As illustrated in FIG. 1, the network-based services 110 can include a set of services 112A, 112B, 112C, etc. Illustratively, each service can be configured with defined functionality based on configuration information or executable commands. As described herein, the services 112A, 112B, 112C can correspond to any number of instantiated network devices or network resources that are targets for being configured, manipulated, abused, or compromised in a manner by a malware code distribution node to elicit or contribute to a coordinated attack, such as a DDOS attack. Additionally, in some embodiments, the services 112A, 112B, 112C represent different logical or geographic regions provided by the network service 110.

Each of the services is associated with a data store 116 that will be illustratively configured to receive and maintain log files related to the execution of the individual service 112. The logfile/log data is made up of individual log event data. This may be achieved without requiring custom functionality, such as agents. The depiction of the services 112A, 112B, 112C and data store 116 are illustrative in nature and are not intended to depict any required particular architectural configuration, type of external computing device, or interconnection between devices.

Illustratively, the network service 110 can include a plurality of targeted network devices 118A, 118B, 118C (e.g., honeypot network devices) that are specifically monitored to identify configuration and commands transmitted by the malware code distribution node e.g., external computing device 102. The malware code distribution node may exploit a vulnerability of the network instances, including the network devices 118A, 118B, 118C and the services 112A, 112B, 112C to install a malware code on the network devices. The most vulnerable network device may be considered as a "target" or "victim" in the attack. In some embodiments, the network devices 118A, 118B, 118C are honeypot devices. In one embodiment, the honeypot devices can be a set of elastic computing (EC2) instances in which the instance is configured in a manner to be monitored for any manipulation from an external computing device 102.

Figure 2:
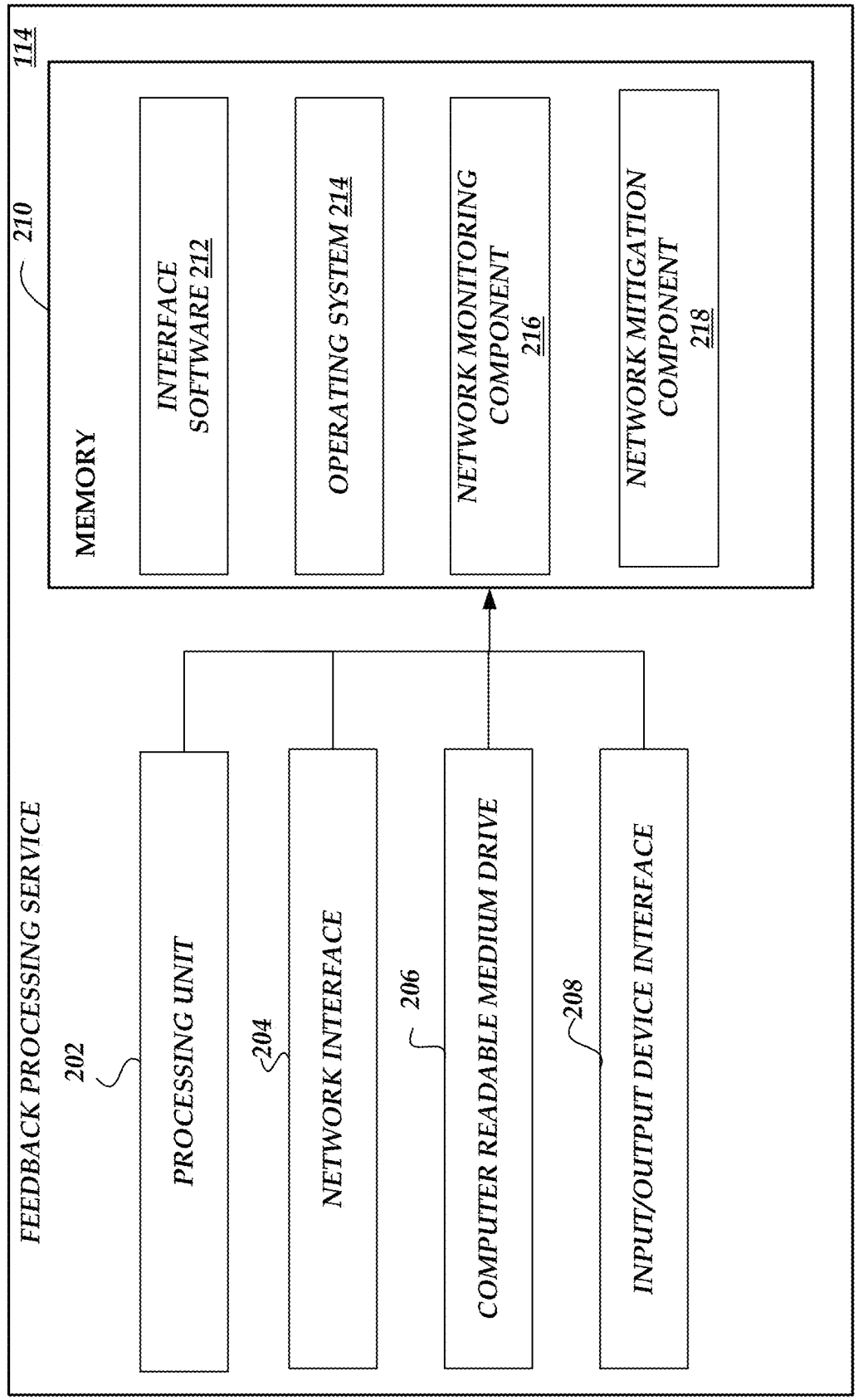
FIG. 2 is a block diagram illustrative of components of a monitoring and mitigation service in accordance with aspects of the present application.

The network service 110 further includes a monitoring and mitigation service 114 that represent the various functions to monitor the malware code installation on network devices by monitoring the utilization of network-based resources, such as one or more of the network-based services 112A, 112B, 112C. The monitoring and mitigation service 114 also may identify the network mitigation information that will be utilized to mitigate communications between the identified/characterized malware code distribution node 102 and the network-based services 112A, 112B, 112C. The network mitigation information can illustratively include null address information for routing components. Illustrative components of the monitoring and mitigation service 114 is depicted in FIG. 2. The monitoring and mitigation service 114 is associated with a network mitigation data store 116 for maintaining the network mitigation information as described herein.

In some embodiments, the monitoring and mitigation service 114 can function as monitoring the network devices 118A, 118B, 118C. In these embodiments, the monitoring and mitigation service 114 may detect a request from the external computing device 102 to install a code (e.g., malware code) on the network device. The monitoring and mitigation service 114 may cause the external computing device to transmit the malware code to the network device. The transmission can also cause malware code to be installed on the network device. The monitoring and mitigation service 114 can detect the malware code installation and identify the IP address of the external computing device 102.

In some embodiments, the monitoring and mitigation service, based on the identified IP address of the external computing device 102, can identify network mitigation information in the form of null routing addresses that will cause network communications to be transmitted from the network device and to the external computing device 102 to be terminated or otherwise not delivered.

The network service 110 further includes routing components 113A, 1131B, 113C that correspond to network routing functionality utilized by the network service 110 to facilitate communications between the network services 112 (or other components) and external computing devices, such as a malware code distribution node. As will be described, one or more routing components 113A, 113B, 113C can be provided or updated with the network mitigation information by the detection and mitigation service 114. The routing components 113A, 113B, 113C may be integrated into the network devices 118A, 118B, 118C, or stand-alone components.

The network service 110 can further be associated with one or more additional services 120. Illustratively, the additional services 120 include stand-alone services or other services that may provide inputs to the detection and mitigation service 114 or otherwise implement a portion of the functionality associated with or utilized by the detection and mitigation service 114. For example, the additional services 120 may provide at least a portion of the detection and characterization of a malware code installation on a network device. The additional services 120 may be hosted as part of network services 110 or can be an independent service hosted separately or by a third party.

FIG. 2 depicts one embodiment of an architecture of an illustrative server for implementing the monitoring and mitigation service 114 as described. The general architecture of the monitoring and mitigation service 114 depicted in FIG. 2 includes an arrangement of computer hardware and software components that may be used to implement aspects of the present disclosure. As previously discussed, the components of the monitoring and mitigation service 114 may include physical hardware components, one or more virtualized components, or a combination thereof. Additionally, the components of the monitoring and mitigation service 114 or the functionality attributed by the interface component service may be implemented in a virtualized environment. Such virtualized environments may be provided by the manufacturer or by a third-party entity, such as a computing service provider that can instantiate software modules that may be persistent or temporary in nature for purposes of implementing the functionality depicted in the illustrative architecture for the monitoring and mitigation service 114.

As illustrated, the monitoring and mitigation service 114 includes a processing unit 202, a network interface 204, a computer readable medium drive 206, and an input/output device interface 208, all of which may communicate with one another by way of a communication bus. The components of the monitoring and mitigation service 114 may be physical hardware components or implemented in a virtualized environment.

The network interface 204 may provide connectivity to one or more networks or computing systems, such as the network 106 of FIG. 1. The processing unit 202 may thus receive information and instructions from other computing systems or services via a network. The processing unit 202 may also communicate to and from memory 210 and further provide output information for an optional display via the input/output device interface 208. In some embodiments, the monitoring and mitigation service 114 may include more (or fewer) components than those shown in FIG. 2.

The memory 210 may include computer program instructions that the processing unit 202 executes in order to implement one or more embodiments. The memory 210 generally includes RAM, ROM, or other persistent or non-transitory memory. The memory 210 may store an operating system 214 that provides computer program instructions for use by the processing unit 202 in the general administration and operation of the monitoring and mitigation service 114. The memory 210 may further include computer program instructions and other information for implementing aspects of the present disclosure. In some embodiments, the memory 210 includes a network monitoring component 216 that is configured to monitor attributes of network resources and detect a malware code installation on at least one of the network devices. In these embodiments, the network monitoring component 216 can identify the external computing device that sent the malware code to the network devices. The memory 210 further includes a network mitigation component 218 that is configured to identify and implement network mitigation information as described herein. In some embodiments, the network monitoring component 216 and the network mitigation component 218 can a combined as a monitoring and mitigation component.

Figure 3A:
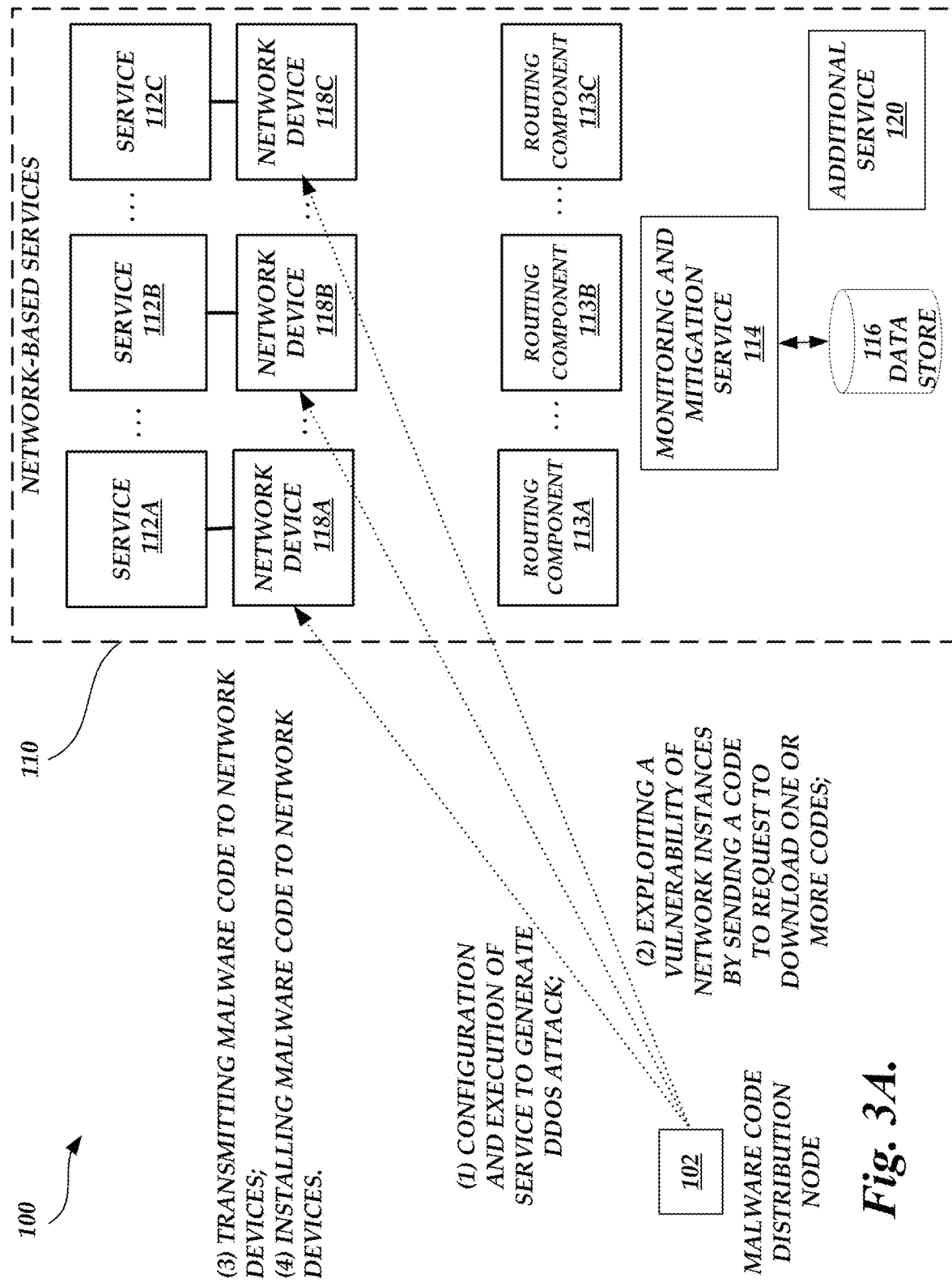
FIGS. 3A-3B are block diagrams of the system of FIG. 1 illustrating various interactions of the components related to monitoring network-based services and implementing network mitigation techniques in accordance with aspects of the present application.
Figure 3B:
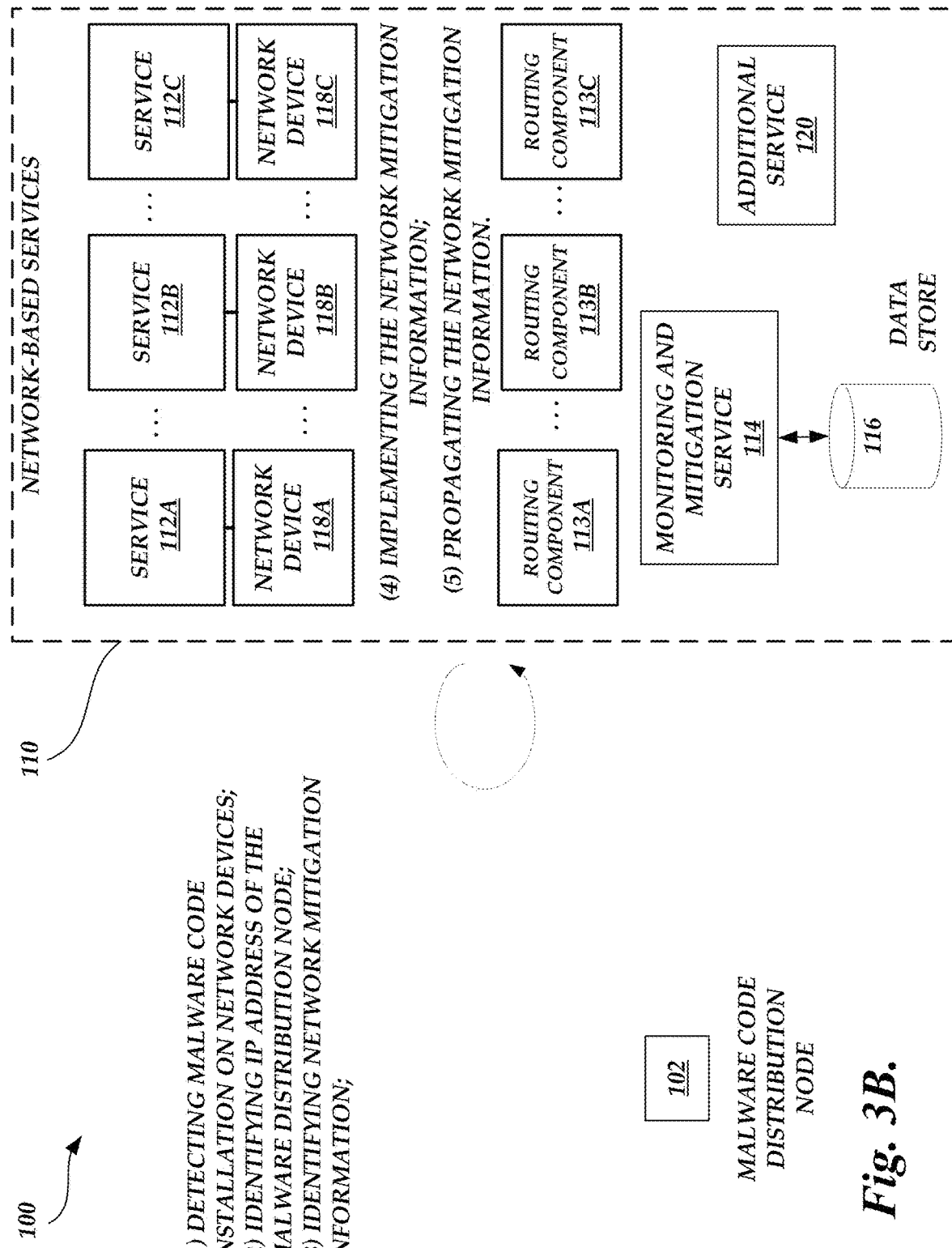

Turning now to FIGS. 3A-3B, illustrative interactions of the components of the system 100 will be described. For purposes of the illustration, it can be assumed that a network service 110 has been configured in a manner to implement a plurality of network services 112 on behalf of a customer. The present application is not intended to be limited to any particular type of service or the number of individual services that may be accessed or generate processing results as part of an execution of an application on behalf of customers. Furthermore, the present application is not intended to be limited to the number of network devices that are monitored by the monitoring or mitigation service 114. Additionally, for purposes of the present application, external computing device 102 will be considered a malware code distribution node that a third party is utilizing (e.g., an entity or software code) to cause a malware code installation in a network device, causing an attack on network-based services. Such network-based resources can be considered to be compromised or manipulated when utilized in such a manner.

With reference to FIG. 3A, an illustrative interaction prior to the implementation of network mitigation techniques, will be described. The present application does not require that an attack, such as a coordinated DDOS attack, occur prior to implementing the network mitigation techniques described herein. Accordingly, the interaction is illustrative. At (1), a malware code distribution node configures the execution of the services from the network-based services 110. Illustratively, the configuration of the services includes the generation of commands or configuration that causes the instantiation of one or more network services 112A, 112B, 112C for purposes of executing a coordinated attack. The configuration of the services 112A, 112B, 112C can also include one or more previously instantiated services. One skilled in the relevant art will appreciate that an external computing device/individual may utilize various techniques to be able to manipulate the network resources 112A, 112B, 112C, including various fraudulent or prohibited actions.

At (2), the malware code distribution node 102 may exploit a vulnerability of each network instance by sending a code that requests to download one or more codes from the malware code distribution node 102. The network instances can include services 112A, 112B, 112C and devices 118A, 118B, 118C. For example, the malware code distribution node 102 may determine each network device's weakness in terms of the operating system software, firewalls, existing malware code, etc.

At (3), responsive to the request to transmit the malware code from the malware code distribution node 102, the services 112A, 112B, 112C may cause the malware code transmission into the network devices 118A, 118B, 118C.

At (4), the malware code is transmitted and installed to the network devices 118A, 118B, 118C. As described above, the network devices 118A, 118B, 118C that the malware code is installed and executed may be subject to significant disruption or limitation of operational status, which may be independent of the network service provider. Additionally, the manipulation of computing resources (e.g., services 112A, 112B, 112C) for purposes of generating large scale network attacks, such as DDOS attacks, especially in multi-tenant network resources, can present significant inefficiencies for the network service provider, including limiting the functionality of network resources, consuming network bandwidth and disrupting operations or functionality provided by the network service 110.

In some embodiments, the network devices 118A, 118B, 118C are honeypot devices. In one embodiment, the honeypot devices can be a set of elastic computing (EC2) instances in which the instance is configured in a manner to be monitored for any manipulation from the external computing device 102.

With reference to FIG. 3B, at (1), the monitoring and mitigation service 114 may detect the malware code installation (shown in FIG. 3A) by scanning the network devices 118A, 118B, 118C. Optionally, to increase confidence that the malware code distribution node 102 caused the malware code installation, the monitoring, and mitigation service 114, after detecting the malware code installation, can obtain and analyze network attributes or metrics associated with the network resource usage or configurations or commands generated by the network devices 118A, 118B, 118C, where the malware code is installed in the network devices.

At (2), the monitoring and mitigation service 114, after detecting the malware code installation, can identify the internet protocol (IP) address of the malware code distribution node 102. To identify the IP address, the monitoring and mitigation service may encode any routing information that has been used to transmit the malware code to the network devices 118A, 118B, 118C from the malware code distribution node 102.

At (3), the monitoring and mitigation service 114, using the IP address and the routing information, can identify network mitigation information in the form of null routing addresses that will cause network communications to be transmitted from network devices 118A, 118B, 118C to the malware code distribution node 102 to be terminated or otherwise not delivered. More specifically, in one embodiment, the null routing addresses can correspond to the utilization of 32-bit addresses in the routing information that can define routing information to a network address that does not correspond to the originally intended command and control node (or other node) or that otherwise results in the termination/dropping of communications that were originally intended for a command and control node. In another embodiment, the null routing addresses can correspond to the utilization of 128-bit addresses in the routing information that can define routing information that does not correspond to the malware code distribution node or that results in the termination/dropping of communications. This will cause the cessation of communications to the malware code distribution node. Illustratively, the cessation of communication can include but is not limited to the termination, blocking, or mitigation of outgoing network traffic that would be received by the command and control node. The monitoring and mitigation service 114 can maintain a set of such null addresses that may be utilized multiple times for different applications of the mitigation technique and, illustratively, are not unique to the command and control node.

In some embodiments, the network mitigation information can be associated with expiration criteria for the routing components that receive and implement the network mitigation technique. The expiration criteria can correspond to time-based criteria or event-based criteria. After the expiration of the network mitigation information, the monitoring and mitigation service 114 can renew the network mitigation information and cause the withdrawal of the network mitigation information.

At (4), the monitoring and mitigation service 114 may implement the identified network mitigation information across the network devices 118A, 118B, 118C to limit the network devices from receiving the configuration information or additional malware code that would be required for exploitation. At (5), the monitoring and mitigation service can propagate the network mitigation information, such as the null routing address, to routing components within the network service provider network. The routing components will then be updated with the network mitigation information to implement the network mitigation technique. The receiving routers can propagate the network mitigation information such that network mitigation information can be implemented across multiple regions. In other embodiments, the monitoring and mitigation service 114 can select network devices 118 by specific region so that only a partial distribution of the network mitigation information is provided. The monitoring and mitigation service 114 can further implement additional logic that will keep the network mitigation information from being further updated or overwritten for a period of time.

Figure 4:
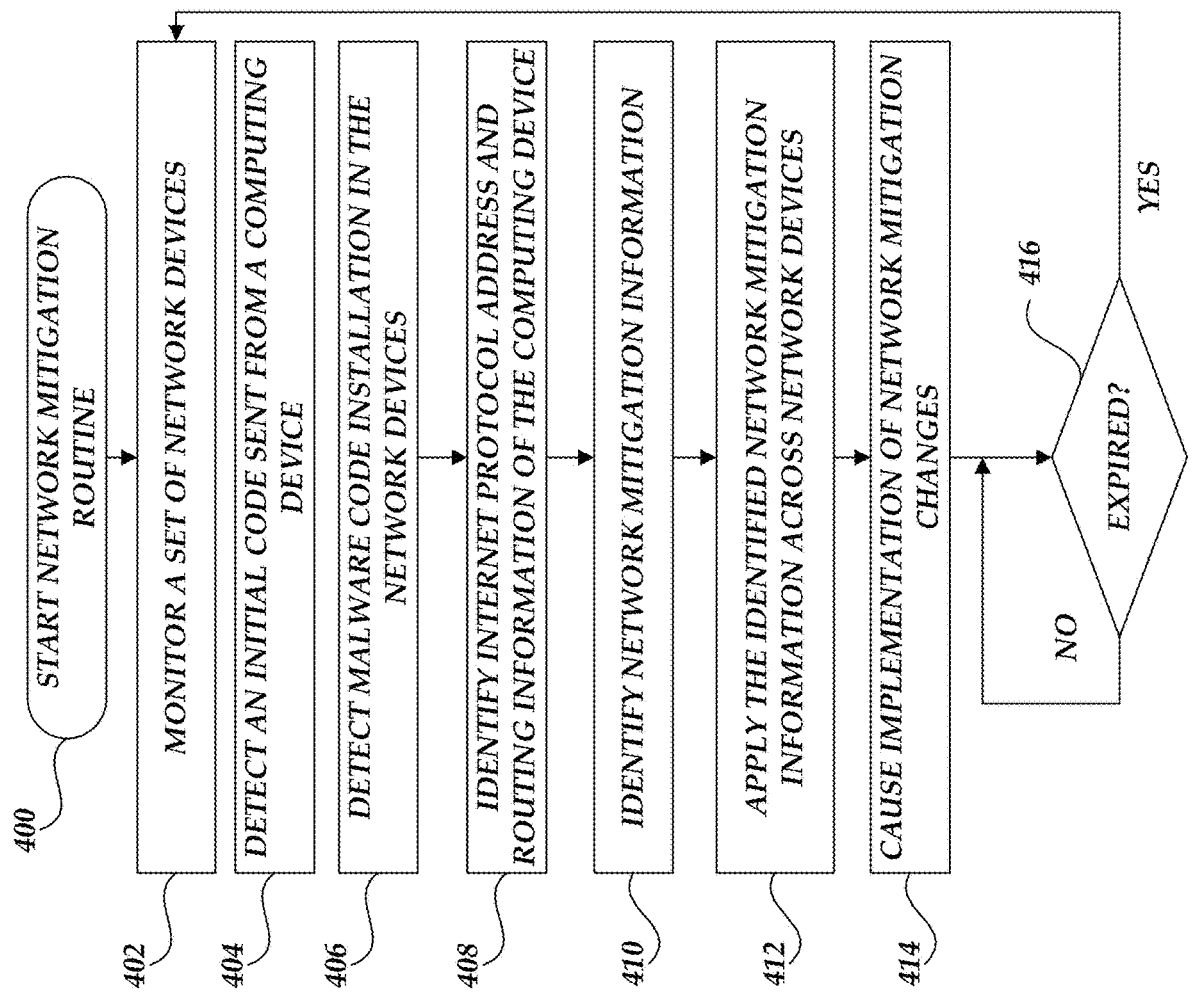
FIG. 4 is a flow diagram depicting an example routine for network mitigation monitoring in accordance with aspects of the present application.

Turning now to FIG. 4, a routine 400 for network management utilizing network mitigation information will be described. Routine 400 is illustratively implemented by the monitoring and mitigation service 114.

At block 402, the monitoring and mitigation service can monitor a set of network devices. In some embodiments, the set of network devices is a set of honeypot devices. In one embodiment, the honeypot devices can be a set of elastic computing (EC2) instances in which the instance is configured in a manner to be monitored for any manipulation from the external computing device 102.

At block 404, the monitoring and mitigation service 114 can detect an initial code sent from an external computing device. The initial code can be a request to install a malware code by exploiting the vulnerability of network instances. In response to the request, the monitoring and mitigation service 114 may cause the malware code installation by transmitting a response to the external computing device.

At block 406, the monitoring and mitigation service 114 can detect the malware code installation on the network devices. In some embodiments, to increase confidence that the external computing device caused the malware code installation, the monitoring, and mitigation service 114, after detecting the malware code installation, can obtain and analyze network attributes or metrics associated with the network resource usage or configurations or commands generated by the malware code installed network devices.

At block 408, the monitoring and mitigation service 114, after detecting the malware code installation, can identify the internet protocol (IP) address of the external computing device (malware code distribution node 102 as shown in FIG. 3B). To identify the IP address, the monitoring and mitigation service may encode any routing information that has been used to transmit the malware code to the network devices 118A, 118B, 118C from the external computing device.

At block 410, the monitoring and mitigation service 114, using the identified IP address and the routing information, can identify network mitigation information in the form of null routing addresses that will cause network communications to be transmitted from network devices 118A, 118B, 118C to the malware code distribution node 102 to be terminated or otherwise not delivered. More specifically, in one embodiment, the null routing addresses can correspond to the utilization of 32-bit addresses in the routing information that can define routing information to a network address that does not correspond to the command and control node or that results in the termination/dropping of communications. In another embodiment, the null routing addresses can correspond to the utilization of 128-bit addresses in the routing information that can define routing information that does not correspond to the malware code distribution node or that results in the termination/dropping of communications. This will cause the cessation of communications to the malware code distribution node. Illustratively, the cessation of communication can include but is not limited to the termination, blocking, or mitigation of outgoing network traffic that would be received by the command and control node. The monitoring and mitigation service 114 can maintain a set of such null addresses that may be utilized multiple times for different applications of the mitigation technique and, illustratively, are not unique to the command and control node. In some embodiments, the network mitigation information can be associated with expiration criteria for the routing components that receive and implement the network mitigation technique. The expiration criteria can correspond to time-based criteria or event-based criteria. After the expiration of the network mitigation information, the monitoring and mitigation service 114 can renew the network mitigation information and cause the withdrawal of the network mitigation information.

At block 412, the monitoring and mitigation service 114 may apply the identified network mitigation information across the network devices 118A, 118B, 118C to limit the network devices from receiving the configuration information or additional malware code that would be required for exploitation.

At block 414, the monitoring and mitigation service can propagate the network mitigation information, such as the null routing address, to routing components within the network service provider network. The routing components will then be updated with the network mitigation information to implement the network mitigation technique. The receiving routers can propagate the network mitigation information such that network mitigation information can be implemented across multiple regions. In other embodiments, the monitoring and mitigation service 114 can select network devices 118 by specific region so that only a partial distribution of the network mitigation information is provided. The monitoring and mitigation service 114 can further implement additional logic that will keep the network mitigation information from being further updated or overwritten for a period of time.

In some embodiments, the network mitigation information can be associated with expiration criteria for the routing components that receive and implement the network mitigation technique. After the expiration of the network mitigation information, the monitoring and mitigation service 114 can renew the network mitigation information and cause the withdrawal of the network mitigation information. Accordingly, at decision block 416, the monitoring and mitigation service 114 determines whether the network mitigation information has expired. At the decision block 416, if the monitoring and mitigation service 114 determines that the network mitigation information has expired, the monitoring and mitigation service 114 may withdraw the network mitigation information and renew the network mitigation information by returning to block 402. In addition, if the monitoring and mitigation service 114 determines that the network mitigation information has not expired, the monitoring and mitigation service 114 may remain at the decision block 416 and continue to propagate the network information, such as the null routing address, until the expiration of the network mitigation information.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in and fully automated via software code modules, including one or more specific computer-executable instructions that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of external computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable external computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code that include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system for managing network-based services, the system comprising one or more external computing devices associated with a processor and a memory for executing computer-executable instructions to implement a monitoring and mitigation service, wherein the monitoring and mitigation service is configured to:

monitor a set of network devices, wherein the set of network devices includes a subset of network devices configured solely for monitoring purposes;

detect an initial code sent from an external computing device to the subset of network devices configured solely for monitoring purposes;

install the initial code into one or more of the subset of network devices, wherein installing the initial code causes the one or more of the subset of network devices to transmit a request to install a second code to the external computing device;

scan the subset of network devices configured solely for monitoring purposes to detect characteristics of the request to install the second code, wherein the characteristics of the request to install the second code include at least an internet protocol (IP) address of the external computing device;

identify, using the identified IP address of the external computing device, a network mitigation information in a form of null routing addresses, wherein the network mitigation information is associated with an expiration criteria;

cause an implementation of the network mitigation information in one or more routing components associated with network devices such that communications with the external computing device are mitigated;

determine that the network mitigation information has expired; and cause at least one renewal of the network mitigation information or withdrawal of the network mitigation information based on the determined expiration.

2. The system as recited in claim 1, wherein the second code is a malware code.

3. The system as recited in claim 1, wherein the monitoring and mitigation service causes the implementation of the network mitigation information in a plurality of routing components.

4. The system as recited in claim 3, wherein the plurality of routing components corresponds to two or more regions hosted by network service providers.

5. The system as recited in claim 1, wherein the monitoring and mitigation service causes the implementation of the network mitigation information in routing components corresponding to identified regions.

6. A method for managing for network-based services comprising:

monitoring a set of network devices, wherein the set of network devices includes a subset of network devices configured solely for monitoring purposes;

installing an initial code sent from an external computing device into one or more of the subset of network devices, wherein the installed initial code causes the one or more of the subset of network devices to transmit a request to install a second code to the external computing device;

scanning the subset of network devices configured solely for monitoring purposes to detect the request for second code installation on the subset of network devices;

identifying network mitigation information in a form of null routing addresses based on the detected request for the second code installation; and causing an implementation of the network mitigation information in one or more routing components associated with network devices such that communications with the external computing device are mitigated.

7. The method of claim 6, wherein scanning the subset of network devices configured solely for monitoring purposes to detect the request for the second code installation on the subset of network devices by identifying an internet protocol (IP) address of the external computing device.

8. The method in claim 6 further comprising, in response to detecting the request for the second code installation on the subset of network devices, obtaining and analyzing network attributes or metrics associated with network resource usages or configurations or commands generated by the subset of network devices.

9. The method in claim 6, wherein the implementation of the network mitigation information causes the implementation of the network mitigation information in a plurality of routing components.

10. The method in claim 9 wherein the plurality of routing components corresponds to two or more regions hosted by network-based service providers.

11. The method in claim 10, wherein the implementation of the network mitigation information causes the implementation of the network mitigation information in routing components corresponding to the two or more regions hosted by the network-based service providers.

12. The method as recited in claim 6, wherein the network mitigation information is associated with expiration criteria, the method further comprising determining that the network mitigation information has expired.

13. The method as recited in claim 12 further comprising causing at least one renewal of the network mitigation information or withdrawal of the network mitigation information based on the determined expiration.

14. A method for managing network-based services comprising:
   installing an executable code sent from an external computing device into a set of dedicated network devices;
   responsive to install the executable code to the set of dedicated network devices configured solely for monitoring purposes, identifying network mitigation information to cause a mitigation of network communications between the external computing device and the set of dedicated network devices; and
   causing an implementation of the network mitigation information in one or more routing components associated with the dedicated network devices.

15. The method of claim 14 further comprising;
   monitoring one or more attributes of network resource utilization by the external computing device, the network resource utilization corresponding to the execution of network based resources responsive; and
   identifying characteristics of the identified external computing device based on the one or more attributes of network resource utilization.

16. The method as recited in claim 14, wherein causing the implementation of the network mitigation information includes causing the implementation of the network mitigation information in a plurality of routing components associated with the network devices.

17. The method as recited in claim 16, wherein the plurality of routing components corresponds to two or more regions hosted by network-based service providers.

18. The method in claim 17, wherein the implementation of the network mitigation information causes the implementation of the network mitigation information in routing components corresponding to the two or more regions hosted by the network-based service providers.

19. The method as recited in claim 14, wherein the network mitigation information is associated with expiration criteria, the method further comprising determining that the network mitigation information has expired.

20. The method as recited in claim 19 further comprising causing at least one of a renewal of the network mitigation information or withdrawal of the network mitigation information based on the determined expiration.

21. The method as recited in claim 14, wherein the network mitigation information include null address information.

22. The method as recited in claim 14, wherein causing an implementation of the network mitigation information in the one or more routing components associated with the dedicated network devices includes causing a cessation of communications to the external computing device.

\* \* \* \* \*